United States Patent
Singhal

[15] 3,681,377
[45] Aug. 1, 1972

[54] ISOTHIOCYANATOMETHYL AND THIOCYANATOMETHYL HYDANTOINS

[72] Inventor: Gopal H. Singhal, Westfield, N.J.

[73] Assignee: Esso Research and Engineering Company

[22] Filed: May 13, 1970

[21] Appl. No.: 37,018

[52] U.S. Cl..........260/309.5, 260/294.8 C, 424/273
[51] Int. Cl.................................................C07d 49/32
[58] Field of Search...................................260/309.5

[56] References Cited

UNITED STATES PATENTS 2,829,083 4/1958 Lo..............................260/309.7
3,050,526 8/1962 Lo..............................260/304
3,591,590 7/1971 Haug et al..................260/309.5

OTHER PUBLICATIONS

Zumach et al., Chem. Abst. Vol. 71, No. 12858q (1969) QDI.A51.

Primary Examiner—Natalie Trousof
Attorney—Chasan and Sinnock and John Paul Corcoran

[57] ABSTRACT

Isothiocyanatomethyl and thiocyanatomethyl hydantoin derivatives corresponding to the following structure:

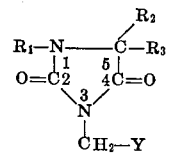

wherein $R_1$ is one selected from the group consisting of $C_1$–$C_{12}$ alkyl optionally substituted by chlorine, bromine, $C_1$–$C_6$ alkoxy, cyano, or $C_1$–$C_6$ alkylthio; $C_3$–$C_{10}$ carbalkoxyalkyl; $C_3$–$C_6$ alkenyl, $C_3$–$C_6$ alkynyl, $C_3$–$C_8$ cycloalkyl; phenyl optionally substituted with chlorine, bromine, trifluoromethyl, $C_1$–$C_6$ alkyl, $C_1$–$C_6$ alkoxy, $C_1$–$C_6$ alkylthio or $NO_2$, tetrahydrofurfuryl, $C_2$–$C_4$ acyl; $R_2$ and $R_3$ can be the same or different and either one is selected from the group consisting of hydrogen, $C_1$–$C_4$ alkyl, $C_1$–$C_4$ chloroalkyl, $C_1$–$C_4$ alkoxy and phenyl; the alkyl groups at 1 and 5 positions may further be joined to give a five or six membered cyclic ring, Y is selected from the group NCS and SCN; have been found to possess a high degree of soil fungicidal activity.

15 Claims, No Drawings

ISOTHIOCYANATOMETHYL AND THIOCYANATOMETHYL HYDANTOINS

This invention relates to isothiocyanatomethyl and thiocyanatomethyl derivatives of hydantoin compounds. In one aspect, this invention relates to the use of these compounds as soil fungicides.

The thiocyanatomethyl hydantoin compounds of the subject invention represented by the following structural formula:

$$\begin{array}{c} R_2 \\ R_1-N-\overset{|}{\underset{1}{C}}-R_3 \\ O=\overset{|}{\underset{2}{C}} \quad \overset{|}{\underset{4}{C}}=O \\ \overset{\diagdown}{\underset{3}{N}}\diagup \\ | \\ CH_2-Y \end{array}$$

wherein $R_1$ is one selected from the group consisting of $C_1$–$C_{12}$ alkyl optionally substituted by chlorine, bromine, $C_1$–$C_6$-alkoxy, cyano, or $C_1$–$C_6$ alkylthio; $C_3$–$C_{10}$ carbalkoxyalkyl; $C_3$–$C_6$ alkenyl; $C_3$–$C_6$ alkynyl; $C_3$–$C_8$ cycloalkyl; phenyl optionally substituted with chlorine, bromine, trifluoromethyl, $C_1$–$C_6$ alkyl, $C_1$–$C_6$ alkoxy, $C_1$–$C_6$ alkylthio or $NO_2$; tetrahydrofurfuryl; $C_2$–$C_4$ acyl; $R_2$ and $R_3$ can be the same or different and either one is selected from the group consisting of hydrogen, $C_1$–$C_4$ alkyl, $C_1$–$C_4$ chloroalkyl, $C_1$–$C_4$ alkoxy and phenyl; the alkyl groups at 1 and 5 positions may further be joined to give a five or six membered cyclic ring; Y is selected from the group NCS and SCN; have been found to possess a high degree of soil fungicidal activity.

Exemplary of such thiocyanatomethylhydantoin compounds which are encompassed by the subject invention are the following:

1. 1-Phenyl-3-thiocyanatomethylhydantoin
2. 1-Phenyl-3-isothiocyanatomethylhydantoin
3. 1-p-Chlorophenyl-3-thiocyanatomethylhydantoin
4. 1-p-Chlorophenyl-3-isothiocyanatomethylhydantoin
5. 1-m-Chlorophenyl-3-isothiocyanatomethylhydantoin
6. 1-o-Chlorophenyl-3-thiocyanatomethylhydantoin
7. 1-(3,4-Dichlorophenyl)-3-isothiocyanatomethylhydantoin
8. 1-(2,4-Dichlorophenyl)-3-isothiocyanatomethylhydantoin
9. 1-m-Trifluoromethylphenyl-3-isothiocyanatomethylhydantoin
10. 1-m-Trifluoromethylphenyl-3-thiocyanatomethylhydantoin
11. 1-p-Nitrophenyl-3-isothiocyanatomethylhydantoin
12. 1-m-Nitrophenyl-3-thiocyanatomethylhydantoin
13. 1-p-Methylthiophenyl-3-thiocyanatomethylhydantoin
14. 1-p-Tolyl-3-isothiocyanatomethylhydantoin
15. 1-(2,6-Diethylphenyl)-3-isothiocyanatomethylhydantoin
16. 1-Methyl-3-isothiocyanatomethylhydantoin
17. 1-Methyl-3-thiocyanatomethylhydantoin
18. 1-t-Butyl-3-isothiocyanatomethylhydantoin
19. 1-Allyl-3-isothiocyanatomethylhydantoin
20. 1 Allyl-3-thiocyanatomethylhydantoin
21. 1-β-Methoxyethyl-3-isothiocyanatomethylhydantoin
22. 1-β-Ethoxyethyl-3-isothiocyanatomethylhydantoin
23. 1-β-Methylthioethyl-3-thiocyanatomethylhydantoin
24. 1-β-Chloroethyl-3-thiocyanatomethylhydantoin
25. 1-β-Methylthioethyl-3-isothiocyanatomethylhydantoin
26. 1-β-Methoxyethyl-3-thiocyanatomethylhydantoin
27. 1-Nitro-3-isothiocyanatomethylhydantoin
28. 1-Nitro-3-thiocyanatomethylhydantoin
29. 1-Acetyl-3-isothiocyanatomethylhydantoin
30. 1-Acetyl-3-thiocyanatomethylhydantoin
31. 1-Acetyl-5,5-dimethyl-3-isothiocyanatomethylhydantoin
32. 1-Acetyl-5,5-dimethyl-3-thiocyanatomethylhydantoin
33. 5,5-Diphenyl-3-isothiocyanatomethylhydantoin
34. 5,5-Diphenyl-3-thiocyanatomethylhydantoin
35. 1-Cyclohexyl-3-isothiocyanatomethylhydantoin
36. 1-Cyclohexyl-3-thiocyanatomethylhydantoin
37. 1-Dodecyl-3-thiocyanatomethylhydantoin
38. 1-Dodecyl-3-isothiocyanatomethylhydantoin
39. 1-Tetrahydrofurfuryl-3-isothiocyanatomethylhydantoin
40. 1-Benzyl-3-thiocyanatomethylhydantoin
41. 1-Benzyl-3-isothiocyanatomethylhydantoin
42. 1,5,5-Trimethyl-3-isothiocyanatomethylhydantoin
43. 1,5,5-Trimethyl-3-thiocyanatomethylhydantoin
44. 1-Ethyl-5-propyl-3-isothiocyanatomethylhydantoin
45. 1-Ethyl-5,5-dimethyl-3-thiocyanatomethylhydantoin
46. 1-Propyl-5,5-dimethyl-3-isothiocyanatomethylhydantoin
47. 1-Butyryl-3-thiocyanatomethylhydantoin
48. 1-Propionyl-3-isothiocyanatomethylhydantoin
49. 1-Cyanoethyl-3-isothiocyanatomethylhydantoin
50. 1-Cyanoethyl-5,5-dimethyl-3-isothiocyanatomethylhydantoin
51. 1-Carbethoxymethyl-3-thiocyanatomethylhydantoin The compounds can be readily prepared by the following synthetic method which is represented schematically as follows:

$$\underset{\text{I}}{\begin{array}{c} R_2 \\ R_1-N-\overset{|}{\underset{}{C}}\diagdown \\ \overset{|}{\underset{}{C}} \quad \overset{|}{\underset{}{C}}-R_3 \\ O\diagup \quad \overset{\diagdown}{N}\diagup \diagdown O \\ | \\ CH_2-X \end{array}} + MSCN \xrightarrow{\text{Solvent}}$$

$$\underset{\text{II}}{\begin{array}{cc} \begin{array}{c} R_2 \\ R_1-N-\overset{|}{C}\diagdown \\ \overset{|}{C} \quad \overset{|}{C}-R_3 \\ O\diagup \quad \overset{\diagdown}{N}\diagup \diagdown O \\ | \\ CH_2-SCN \end{array} & + & \begin{array}{c} R_2 \\ R_1-N-\overset{|}{C}\diagdown \\ \overset{|}{C} \quad \overset{|}{C}-R_3 \\ O\diagup \quad \overset{\diagdown}{N}\diagup \diagdown O \\ | \\ CH_2NCS \end{array} \end{array}}$$

wherein $R_1$, $R_2$, $R_3$ are defined as hereinbefore. M can be K, Na and $NH_4$, X can be Cl or Br. The solvent can be one selected from ketones such as acetone, ethylmethylketone, etc., acetonitrile, sulfolane, dimethylformamide, dimethylacetamide, N-methyl-pyrrolidone, chloroform, acetonitrile, preferably acetonitrile or acetone. The reaction is run at a temperature ranging from 0° – 150°C., preferably 25° – 80°C., and under a pressure ranging from 1–10 atmospheres, preferably atmospheric.

Fungicidal compositions of the invention are prepared by admixing one or more of the active ingredients defined heretofore, in fungicidally effective amounts with a conditioning agent of the kind used and referred to in the art as a pest control adjuvant or modifier to provide formulations adapted for ready and efficient application to soil using conventional applicator equipment.

Thus, the fungicidal compositions or formulations are prepared in the form of solids or liquids. Solid compositions are preferably in the form of granulars or dusts.

The compositions can be compounded to give homogeneous free-flowing dusts by admixing the active compound or compounds with finely divided solids preferably talc, natural clays, pyrophyllite, diatomaceous earth, or flours such as walnut shell, wheat, redwood, soya bean, and cottonseed flours. Other inert solid conditioning agents or carriers of the kind conventionally employed in preparing pest control compositions in the powdered form can be used.

Granulars can be compounded by absorbing the compound in liquid form onto a preformed granular diluent. Such diluents as natural clays, pyrophyllite, diatomaceous earth, flours such as walnut shell, as well as granular sand can be employed.

In addition, granulars can also be compounded by admixing the active ingredient with one of the powdered diluents described hereinabove, followed by the step of either pelleting or extruding the mixture.

Liquid compositions of the invention are prepared in the usual way by admixing one or more of the active ingredient with a suitable liquid diluent medium. In the cases where the compounds are liquids, they may be sprayed in ultra low volume as such. With certain solvents, such as alkylated naphthalene or other aromatic petroleum solvents, dimethyl formamide, cycloketone, relatively high up to about 50 percent by weight or more concentration of the active ingredient can be obtained in solution.

The fungicidal compositions of the invention whether in the form of dusts or liquids, preferably also include a surface-active agent sometimes referred to in the art as a wetting, dispersing, or emulsifying agent. These agents, which will be referred to hereinafter more simply as surface-active dispersing agents, cause the compositions to be easily dispersed in water to give aqueous sprays which, for the most part, constitute a desirable composition for application.

Generally, the surface-active agent will not comprise more than about 5 to 15 percent by weight of the composition, and in certain compositions the percentage will be 1 percent or less. Usually, the minimum lower concentration will be 0.1 percent.

The fungicidal compositions are applied either as a spray, granular or a dust to the locus or area to be protected from undesirable pathogens. Such application can be made directly upon the locus or area and plants thereon during the period of fungus infestation in order to destroy the pathogens, but preferably, the application is made in advance of an anticipated fungus infestation to prevent such infestation. Thus, the compositions can be applied as sprays directly to the surface of the soil. Alternatively, the dry powdered compositions can be dusted on the soil.

In applying the fungicidal compositions of the invention for selective fungus control as in the control of soil fungi in cotton or corn fields, the compositions are preferably applied after planting of the crop seeds but before emergence of the seedlings.

The active compound is, of course, applied in an amount sufficient to exert the desired fungicidal action. The amount of the active compound present in the compositions as actually applied for destroying or preventing the fungus infestation will vary with the manner of application, the particular fungus for which control is sought, the purposes for which the application is being made, and like variables. In general, the fungicidal compositions as applied in the form of a spray, dust or granular, will contain from about 0.1 to 100 percent by weight of the active compound.

Fertilizer materials, other fungicidal agents, and other pest control agents such as insecticides and herbicides can be included in the fungicidal compositions of the invention if desired.

The term "carrier" or "diluent" as used herein means a material, which can be inorganic or organic and synthetic or of natural origin, with which the active ingredient is mixed or formulated to facilitate its storage, transport, and handling and application to the plants to be treated. The carrier is preferably biologically and chemically inert and, as used, can be a solid or fluid. When solid carriers are used, they are preferably particulate, granular or pelleted; however, other shapes and sizes of solid carrier can be employed as well. Such preferably solid carriers can be natural occurring minerals — although subsequently subjected to grinding, sieving, purification, and/or other treatments — including, for example, gypsum; tripolite; diatomaceous earth; mineral silicates such as mica, vermiculite, talc, and pyrophyllite; clays of the montmorillonite, kaolinite, or attapulgite groups, calcium or magnesium limes, or calcite and dolomite; etc. Carriers produced synthetically, as for example, synthetic hydrated silica oxides and synthetic calcium silicates can also be used, and many proprietary products of this type are available commercially. The carrier can also be an elemental substance such as sulfur or carbon, preferably an activated carbon. If the carrier possesses intrinsic catalytic activity such that it would decompose the active ingredient, it is advantageous to incorporate a stabilizing agent.

Fluid carriers can be liquids, or an organic fluid, including a liquefied normally vaporous or gaseous material, or a vaporous or gaseous material, and can be solvents or nonsolvents for the active material. For example, the horticultural petroleum spray oils boiling in the range of from about 275° to about 575° F., or boiling in the range of about 575° to about 1,000° F. and having an unsulfonatable residue of at least about 75 percent and preferably of at least about 90 percent, or mixtures of these two types of oil, are particularly suitable liquid carriers.

The carrier can be mixed or formulated with the active material during its manufacture or at any stage subsequently. The carrier can be mixed or formulated with the active material in any proportion depending on the nature of the carrier. One or more carriers, moreover, can be used in combination.

The compositions of this invention can be concentrates, suitable for storage or transport and containing, for example, from about 5 to about 90 percent by weight of the active ingredient, preferably from about 20 to about 80 wt. percent. These concentrates can be diluted with the same or different carrier to a concentration suitable for application. The compositions of this invention may also be dilute compositions suitable for application. In general, concentrations of about 0.1 to about 10 percent by weight, of active material based on the total weight of the composition are satisfactory, although lower and higher concentrations can be applied if necessary.

The compositions of this invention can also be formulated as dusts. These comprise an intimate admixture of the active ingredient and a finely powdered solid carrier such as aforedescribed. The powdered carriers can be oil-treated to improve adhesion to the surface to which they are applied. These dusts can be concentrates, in which case a highly sorptive carrier is preferably used. These require dilution with the same or a different finely powdered carrier, which can be of lower sorptive capacity, to a concentration suitable for application.

The compositions of the invention can be formulated as wettable powders comprising a major proportion of the active ingredient mixed with a dispersing, i.e., deflocculating or suspending agent, and if desired, a finely divided solid carrier and/or a wetting agent. The active ingredient can be in particulate form or adsorbed on the carrier and preferably constitutes at least about 10 percent, more preferably at least about 25 percent, by weight of the composition. The concentration of the dispersing agent should in general be between about 0.5 and about 5 percent by weight of the total composition, although larger or smaller amounts can be used if desired.

The dispersing agent used in the composition of this invention can be any substance having definite dispersing, i.e., deflocculating or suspending, properties as distinct from wetting properties, although these substances can also possess wetting properties as well.

The dispersant or dispersing agent used can be protective colloids such as gelatin, glue, casein, gums, or a synthetic polymeric material such as methyl cellulose.

The wetting agents used can be nonionic type surfactants, as for example, the condensation products of fatty acids containing at least 12, preferably 16 to 20, carbon atoms in the molecule, or abietic acid or naphthenic acid obtained in the refining of petroleum lubricating oil fractions with alkylene oxides such as ethylene oxide or propylene oxide, or with both ethylene oxide and propylene oxide, as for example, the condensation product of oleic acid and ethylene oxide containing about six to 15 ethylene oxide units in the molecule. Esters of the above acids with polyhydric alcohols such as glycerol, polyglycerol, sorbitol, or mannitol can be used.

The compositions of this invention can also be formulated as solutions of the active ingredient in an organic solvent or mixture of solvents, such as for example, ketones, especially acetone; ethers; hydrocarbons; etc.

Petroleum hydrocarbon fractions used as solvents should preferably have a flash point above 73° F., an example of this being a refined aromatic extract of kerosene. Auxiliary solvents such as ketones, and polyalkylene glycol ethers and esters can be used in conjunction with these petroleum solvents.

Compositions of the present invention can also be formulated as emulsifiable concentrates which are concentrated solutions or dispersion of the active ingredient in an organic liquid, preferably a water-insoluble organic liquid, containing an added emulsifying agent. Suitable organic liquids include, e.g., the above petroleum hydrocarbon fractions previously described.

The emulsifying agent can be of the type producing water-in-oil type emulsions which are suitable for application by low volume spraying. In such emulsions, the active ingredient is preferably in a nonaqueous phase.

The present invention is further illustrated in greater detail by the following examples, but it is to be understood that the present invention in its broadest aspects, is not necessarily limited in terms of the reactants, or specific temperatures, residence times, separation techniques and other process conditions, etc.; or dosage level, exposure times, test plants used, etc. by which the compounds and/or compositions described and claimed are prepared and/or used.

Synthesis of starting material, i.e., the chloromethyl or bromomethyl derivatives of hydantoins (I) has been described in pending U.S. application Ser. No. 802, filed on Jan. 5, 1970, now abandoned, by the author.

Specifically said starting materials can be prepared by reacting a 1-substituted hydantoin compound or a 1,5-disubstituted hydantoin compound with formaldehyde, with or without the presence of a catalyst such as hydrochloric acid. These hydroxymethyl derivatives of hydantoins are reacted with a halogenating agent such as thionyl chloride, phosphorus trichloride, phosphorus tribromide, etc. to give the 3-halo methyl derivatives of hydantoin. The sequence of steps forming these starting compounds can be represented as follows:

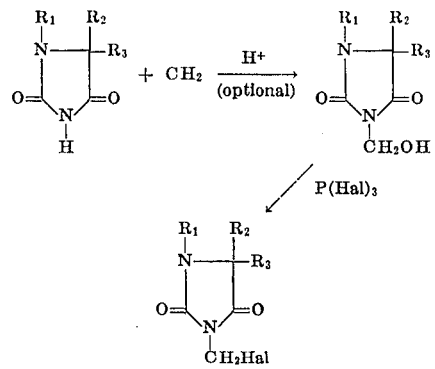

The substituted hydantoins can be prepared according to methods described in Chemical Review 45, 403–07 (1950). Formaldehyde, $P(Hal)_3$, etc., are already available either commercially or through well-known synthetic procedures.

The reaction sequence shown above is general and it is to be understood that reactants and reaction schemes other than that specifically shown can be utilized to achieve the same end products. Thus, for example, hydroxy derivative can be halogenated as follows:

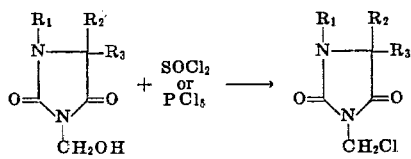

The halogenation step can readily be effected also by the use of reagents such as 48 percent hydrobromic acid, thionyl chloride, phosphorus trichloride, phosphorus tribromide etc. Ammonium or potassium thiocyanates are commercial items.

The following examples are illustrative of this invention and demonstrate the utility of the new compounds prepared in accordance with this invention.

EXAMPLE 1

Synthesis of 1-Acetyl-5,5-dimethyl-3-thiocyanatomethyl hydantoin

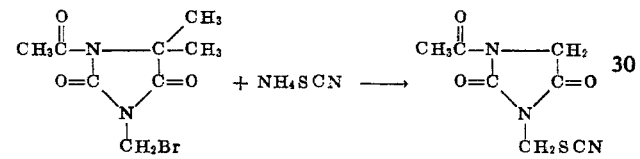

In a reaction flask fitted with a mechanical stirrer and a reflux condenser were placed 13. g. of 1-acetyl-3-bromomethyl-5,5-dimethylhydantoin, 5 g. of ammonium thiocyanate and 350 ml. of acetonitrile and the mixture was refluxed for 4 hours. The precipitated solid was filtered off and the filtrate was evaporated to dryness under reduced pressure. The residue was dissolved in dichloromethane, washed with water, dried over sodium sulfate, filtered, and the filtrate was concentrated under reduced pressure. The residual solid was recrystallized from ether-petroleum ether to give 9.5 g. of solid, m.p. 67°–69°.

Anal. Found: C, 45.25; H, 4.75; N, 17.13
Calcd: C, 44.81; H, 4.56; N, 17.43

Structure was further confirmed by NMR and IR.

EXAMPLE 2

Synthesis of 1-(3,4-dichlorophenyl)-3-isothiocyanatomethyl hydantoin

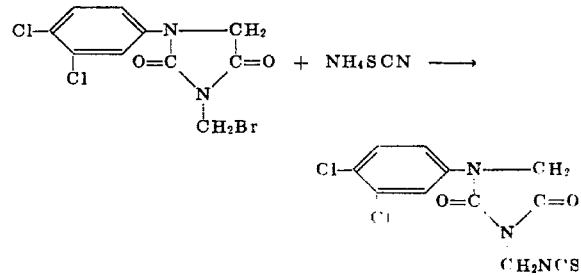

In a reaction flask fitted with a mechanical stirrer and a reflux condenser were placed 7 g. of 3-bromomethyl-1-(3,4-dichlorophenyl)hydantoin, 2.5 g. of ammonium thiocyanate and 100 ml. of acetonitrile and the mixture was refluxed for 2.5 hours. The precipitated solid was filtered off, filtrate was evaporated to dryness and the residue was triturated with chloroform. A portion was recrystallized from Tetrahydrofuran-Petroleum ether, m.p. 127°–129 °(dec).

Anal. Found: C, 42.64; H, 2.74; N, 12.86
Calcd: C, 41.78; H, 2.22; N, 13.28

The structure was further confirmed by NMR and infrared spectroscopy.

EXAMPLE 3

Synthesis of 1-Methyl-3-isothiocyanatomethylhydantoin and 1-methyl-3-thiocyanatomethylhydantoin

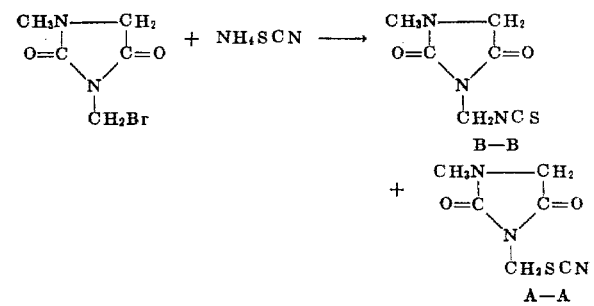

A mixture of 16.8 g. of 3-bromomethyl-1-methyl-hydantoin, 10 g. of ammonium thiocyanate and 400 ml. of acetonitrile in the usual setup was refluxed for 2.5 hr., filtered and the filtrate was concentrated on Rotovac. The residue was taken in chloroform washed with water, dried over sodium sulfate, filtered and again concentrated on Rotovac. The residue was subjected to high vacuum. The yield of yellow oil was 12.7 g.

Anal. Found: C, 39.12; H, 3.87; N, 22.49
Calcd: C, 38.71; H, 3.76; N, 22.58

By NMR analysis the product consisted of 80 percent isothiocyanate (B) and 20 percent of thiocyanate (A).

EXAMPLE 4

In one experiment, the mixture of isothiocyanate (B) and thiocyanate (A) derived from 1-Methylhydantoin (Example 3) was chromatographed over silica gel to give pure (B) as an oil and pure A as a solid, m.p. 59–62°C. The structures of these compounds were confirmed by infrared and NMR spectroscopy. In subsequent preparations no attempt was made to separate the isomers and the reaction products were tested for soil fungicidal activity.

EXAMPLE 5

A number of other isothiocyanato and thiocyanato derivatives of hydantoins were synthesized according to the procedures outlined in Examples 1–3. The compounds prepared are listed in Table I.

TABLE I

| Compound Name | Found | | | Calcd. | | |
|---|---|---|---|---|---|---|
| | C | H | N | C | H | N |
| 1-t-Butyl-3-isothio cyanatomethylhydantoin | 47.15 | 5.99 | 19.04 | 47.58 | 5.73 | 18.50 |

| Compound Name | | | | | |
|---|---|---|---|---|---|
| Mixture of 1-Allyl-3-isothiocyanato methylhydantoin(B) and 1-Allyl-3-thiocyanatomethylhydantoin(A) | 45.78 | 4.47 | 19.81 | 45.50 | 4.27 | 19.90 |
| | 42% A and 58% B by NMR analysis | | | | | |
| Mixture of 1-tetrahydrofurylmethyl-3-isothiocyanomethylhydantoin and 1-tetrahydrofurylmethyl-3-thiocyano methylhydantoin | Structure confirmed by NMR and IR | | | | | |
| Mixture of 1-β-Ethoxyethyl-3-isothiocyanatomethylhydantoin (B) and 1-β-Ethoxyethyl-3-thiocyanatomethylhydantoin (A) | 43.2 | 4 | 5.56 | 16.73 | 44.44 | 5.35 | 17.28 |
| | 25% A and 75% B by NMR analysis | | | | | |
| Mixture of 1-β-Methoxyethyl-3-isothiocyanatomethylhydantoin (B) and 1-β-Methoxyethyl-3-thiocyanatomethylhydantoin (A) | 40.8 | 3 | 4.68 | 16.95 | 41.93 | 4.80 | 18.34 |
| | 56% A and 44% B by NMR analysis | | | | | |
| Mixture of 1-p-Chlorophenyl-3-isothiocyanatomethylhydantoin and 1-p-Chlorophenyl-3-thiocyanatomethylhydantoin | 45.6 | 2 | 3.25 | 14.55 | 46.53 | 2.84 | 14.91 |
| Mixture of 1-Cyclohexyl-3-isothiocyanatomethylhydantoin and 1-Cyclohexyl-3-thiocyanatomethylhydantoin | 52.2 | 1 | 6.25 | 14.99 | 52.12 | 5.93 | 16.60 |

General Experimental Procedures for Biological Testing

In the examples which follow, the new hydantoin thiocyanates and isothiocyanates were tested in the greenhouse and in the laboratory to determine their fungicidal activity.

The experimental compounds were tested as aqueous emulsions. These emulsions were prepared by dissolving the components in acetone and dispersing it in distilled water with Triton X-100, an alkylaryl polyether alcohol derived by the reaction of i-octyl phenol with ethylene oxide, to give spray emulsions containing the desired concentration of the compound. These emulsions were then used in standard laboratory tests described below.

Soil Fungicides

Separate lots of sterilized soil are inoculated with Fusarium, Pythium, Rhizoctonia and Sclerotium. The inoculated soil is placed in 4 oz. dixie cups and drenched with 20 ml. of a formulation containing a concentration of the chemical indicated in the table in the soil. The treated cups are incubated at 70° F. for 2 days. The amount of mycelial growth on the soil surface is then rated on a scale of 0–10, where 0 = no control and 10 = complete control of mycelial growth. A rating of 8–10 moves the chemical to the second stage of testing.

These results are given in Table II.

TABLE II

| Compound Name | Rate lbs./A | Fusarium | Pythium | Rhizoctonia | Sclerotium |
|---|---|---|---|---|---|
| 1-Acetyl-5,5-d methyl-3-thiocyanatom thylhydantoin | 50 | | 10 | | |
| | 25 | | 8 | | |
| | 12.5 | | 6 | | |
| Mixture of 1-Methyl-3-isothiocyan tomethyl hydantoin and 1-methyl-3-thiocyan tomethylhydantoin | 50 | 10 | 9 | 10 | 9 |
| | 25 | 9 | 7 | 9 | 8 |
| | 12.5 | 9 | 5 | 7 | 6 |
| Mixture of 1-Allyl-3-isothiocy natomethyl-hydantoin and 1-Allyl-3-thiocyan tomethylhydantoin | 50 | 10 | 10 | 9 | 9 |
| | 25 | 9 | 10 | 8 | 8 |
| | 12.5 | 8 | 8 | 7 | 7 |
| Mixture of 1-tetrahydrof rfurylmethyl-3-isothio-cyanomethylhydantoin and 1-tetrahydrofurfuryl-methyl-3-thio-cyanomethyl-hydantoin | 50 | 9 | 9 | | 10 |
| | 12.5 | 5 | 4 | | 8 |
| Mixture of 1-β-Ethoxyethyl-3-isothio-cyanatomethyl-hydantoin and 1-β-Ethoxyethyl-3-thiocyanatomethyl-hydantoin | 50 | 9 | 10 | | 10 |
| | 25 | 9 | 8 | | 10 |
| | 12.5 | 6 | 7 | | 9 |
| Mixture of 1-β-Methoxyethyl-3-isothiocyanato-methylhydantoin and 1-β-Methoxyethyl-3-thio-cyanatomethylhydantoin | 50 | 9 | 8 | 8 | 10 |
| | 25 | 9 | 6 | 8 | 10 |
| | 12.5 | 8 | 3 | 6 | 9 |
| 1-p-Chlorophenyl-3-isothio-cyanatomethylhydantoin | 50 | 6 | 5 | 5 | 7 |
| | 25 | 4 | 2 | 0 | 5 |
| | 12.5 | 0 | 0 | 0 | 5 |
| Mixture of 1-Cyclohexyl-3-isothio-cyanatomethyl-hydantoin and 1-Cyclohexyl-3-thiocyanatomethyl-hydantoin | 50 | 9 | 9 | 7 | 9 |
| | 25 | 8 | 8 | 6 | 9 |
| | 12.5 | 7 | 6 | 6 | 7 |
| 1-Methyl-3-thiocyanatom thylhydantoin | 50 | 8 | 9 | 5 | 5 |
| | 25 | 6 | 8 | 4 | 4 |
| | 12.5 | 4 | 8 | 0 | 0 |
| 1-Methyl-3-isothiocyanato ethylhydantoin | 50 | 10 | 10 | 9.5 | 10 |
| | 25 | 10 | 10 | 10 | 10 |
| | 12.5 | 10 | 9 | 8 | 10 |
| Mixture of 1,5-tetramethylene-3-isothiocyanato-methylhydantoin and 1,5-tetramethylene-3d-thio-cyanatomethyl-hydantoin | 50 | 9.5 | 9 | | 9 |
| | 25 | 8 | 8 | 8 | 8 |
| | 12.5 | 6 | 7 | 5 | 8 |

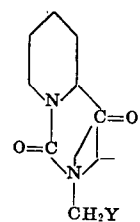

What is claimed is:
1. A compound of the formula:

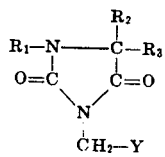

wherein
- $R_1$ is selected from the group consisting of hydrogen; alkyl of from one to 12 carbon atoms optionally substituted by chlorine, alkoxy of from one to six carbon atoms, cyano, or alkylthio of from one to six carbon atoms; carbalkoxyalkyl of from three to ten carbon atoms; alkenyl of from three to six carbon atoms; cyclohexyl; phenyl optionally substituted by chlorine, trifluoromethyl, alkyl of from one to six carbon atoms, or nitro; tetrahydrofurfuryl; alkanoyl of from two to four carbon atoms; and benzyl;
- each of $R_2$ and $R_3$ is selected from the group consisting of hydrogen; alkyl of from one to four carbon atoms; and phenyl; and
- Y is selected from the group consisting of —NCS and —SCN.

2. A compound according to claim 1, which is 1-phenyl-3-thiocyanatomethylhydantoin.

3. A compound according to claim 1, which is 1-phenyl-3-isothiocyanatomethylhydantoin.

4. A compound according to claim 1, which is 1-p-chlorophenyl-3-isothiocyanatomethylhydantoin.

5. A compound according to claim 1, which is 1-t-butyl-3-isothiocyanatomethylhydantoin.

6. A compound according to claim 1, which is 1-allyl-3-isothiocyanatomethylhydantoin.

7. A compound according to claim 1, which is 1-allyl-3-thiocyanatomethylhydantoin.

8. A compound according to claim 1, which is 1-β-ethoxyethyl3-thiocyanatomethylhydantoin.

9. A compound according to claim 1, which is 1-tetrahydrofurfuryl-3-isothiocyanatomethylhydantoin.

10. A compound according to claim 1, which is 1-tetrahydrofurfuryl-3-thiocyanatomethylhydantoin.

11. A compound according to claim 1, which is 1,5,5-trimethyl3-isothiocyanatomethylhydantoin.

12. A compound according to claim 1, which is 1-propionyl-3-isothiocyanatomethylhydantoin.

13. A compound according to claim 1, which is 1-methyl-3-isothiocyanatomethylhydantoin.

14. A compound according to claim 1, which is 1-cyclohexyl-3-isothiocyanatomethylhydantoin.

15. A compound according to claim 1, which is 1-cyclohexyl-3-thiocyanatomethylhydantoin.

* * * * *